United States Patent [19]

Larson et al.

[11] 3,766,404

[45] Oct. 16, 1973

[54] COMPOSITE D.C. AMPLIFIER FOR USE WITH A TOUCH SENSITIVE ELECTRONIC SWITCH

[75] Inventors: Willis A. Larson, Wayzata; Raymond M. Warner, Jr., 5001 Arden Ave., Edina, both of Minn. 55424

[73] Assignee: Magic Dot, Inc., Minneapolis, Minn.

[22] Filed: Nov. 16, 1971

[21] Appl. No.: 199,227

[52] U.S. Cl. .............. 307/116, 307/140, 317/DIG. 2

[51] Int. Cl. .............. H01h 35/00

[58] Field of Search .............. 307/116, 125, 130, 307/131, 139, 140; 317/123, 148.5 R, DIG. 1, DIG. 2, DIG. 3

[56] References Cited

UNITED STATES PATENTS

| | | | |
|---|---|---|---|
| 3,492,541 | 1/1970 | Grebe | 317/DIG. 2 |
| 3,493,791 | 2/1970 | Adelson et al. | 317/DIG. 2 |
| 3,629,665 | 12/1971 | Hoste | 307/116 X |

*Primary Examiner*—Robert K. Schaefer
*Assistant Examiner*—William J. Smith
*Attorney*—Wicks & Nemer

[57] ABSTRACT

A composite D.C. amplifier for use with a touch sensitive electronic switch which has no moving parts and is actuated by the skin resistance of an operator causing a lowering of D.C. resistance across the switch is disclosed. The composite amplifier, in the preferred embodiment, includes five direct coupled transistors and various current limiting and leakage preventing resistors. The amplifier is arranged to accept an input current on the order of nanoamperes from the touch sensitive switch when actuated and provide an output current in the milliampere range or higher to an electrical load and thus appear as an electronic switch which is in a closed or ON condition. The amplifier is also arranged to avoid providing an output current when the switch is not actuated to thus appear as an electronic switch which is in an open or OFF condition.

13 Claims, 3 Drawing Figures

INVENTORS
Willis A. Larson,
BY Raymond M. Warner, Jr.
Wicks & Nemer
ATTORNEYS

COMPOSITE D.C. AMPLIFIER FOR USE WITH A TOUCH SENSITIVE ELECTRONIC SWITCH

CROSS REFERENCE

This application discloses and claims an improvement upon the subject matter disclosed in an application for Letters Patent filed in the name of Willis A. Larson, Serial Number 161,948, now patent number 3,737,670 entitled "Touch Sensitive Electronic Switch". The present application is further a companion application to the applications for patent by: Willis A. Larson and Arthur Kimmell, Serial Number 265,442, filed June 23, 1972, which is a continuation of Serial Number 199,384, filed November 16, 1971, entitled "Touch Sensitive Electronic Switch"; Willis A. Larson, Serial Number 297,410, filed October 13, 1972, which is a continuation of Serial Number 199,195, filed November 16, 1971, entitled "Touch Sensitive Electronic Switch"; Willis A. Larson, Serial Number 199,226, now patent number 3,715,540 entitled "Touch Sensitive Electronic Switch"; and Willis A. Larson and Stephen R. Tell, Serial Number 235,373, now patent number 3,728,501.

BACKGROUND

The present invention relates generally to electronic circuitry, more specifically electronic circuitry for use with electronic switches, and still more particularly to a composite D.C. amplifier for use with a touch sensitive electronic switch which has no moving parts and is actuated by the skin resistance of an operator lowering the D.C. resistance across the switch to provide a D.C. input signal to the composite amplifier.

It has been found that conventional amplifiers are not completely satisfactory for use with touch sensitive electronic switches which are actuated by skin resistance. It has further been found that an amplifier which is satisfactory for use with such touch sensitive switches in a large variety of applications and under a variety of operating conditions should have: direct current coupled stages; high gain; low voltage across its output in the ON condition; low output current in the OFF condition; a low current threshold at the input; and a low voltage offset at the input.

The present invention, after defining and deriving the above advantages, provides such an electronic circuit with these advantages.

SUMMARY

Briefly, a preferred embodiment of the electronic circuit of the present invention comprises a composite of three amplifiers, with one amplifier having two amplifying stages. A first amplifier in the preferred embodiment, is a PNP transistor receiving a DC. input signal from the lowering of the D.C. resistance across a skin resistance actuated electronic switch. The input signal, a current in the nanoampere range, is conducted through a current limiting base resistor and input buffer amplifier to the PNP transistor which in turn, provides an amplified current to a Darlington type amplifier of two NPN transistors. The Darlington type amplifier also in turn provides an amplified D.C. signal to an NPN output transistor which saturates and thus appears as an electronic switch in the closed or ON condition.

Various resistors in the composite amplifier provide for the limiting of current, provide for the dampening of any oscillations, and provide shunting paths for leakage current in the OFF condition to thus provide the advantages discussed above.

Thus, it is an object of the present invention to provide a composite D.C. amplifier for use in conjunction with an electronic switch actuated by the skin resistance of an operator in a large variety of applications and under a variety of conditions.

It is a further object of the present invention to provide such a composite D.C. amplifier having direct coupled stages.

It is a further object of the present invention to provide such a D.C. amplifier having high gain.

It is a further object of the invention to provide such a D.C. amplifier having a low voltage across its output upon the actuation of the touch sensitive electronic switch.

It is a further object of the present invention to provide such a composite D.C. amplifier which will accept an extremely low input current and yet provide gain.

It is a further object of the present invention to provide such a composite D.C. amplifier having a low voltage offset at its input.

It is a further object of the present invention to provide such a composite D.C. amplifier having very low output current if the touch sensitive electrical switch is not actuated.

These and further objects and advantages of the present invention wil become clearer in the light of the following detailed description of an illustrative embodiment of this invention described in connection with the drawings.

Figure 1:
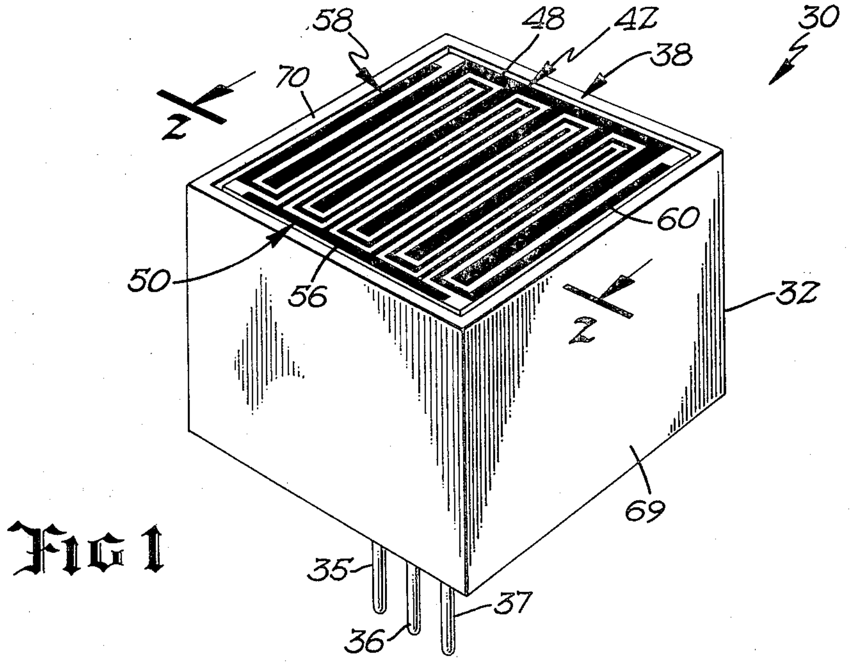
FIGS. 1 and 2 show a touch sensitive electronic switch which may be used in conjunction with the electronic circuitry of the present invention.

Where used in various figures of the drawings, the same numerals designate the same or similar parts. Furthermore, when the terms "right", "left", "front", "back", "vertical", "horizontal", "right edge", and "left edge" are used herein, it should be understood that these terms have reference only to the structure shown in the drawings as it would appear to a person viewing the drawings and are utilized only to facilitate describing the invention.

DESCRIPTION

Figure 2:
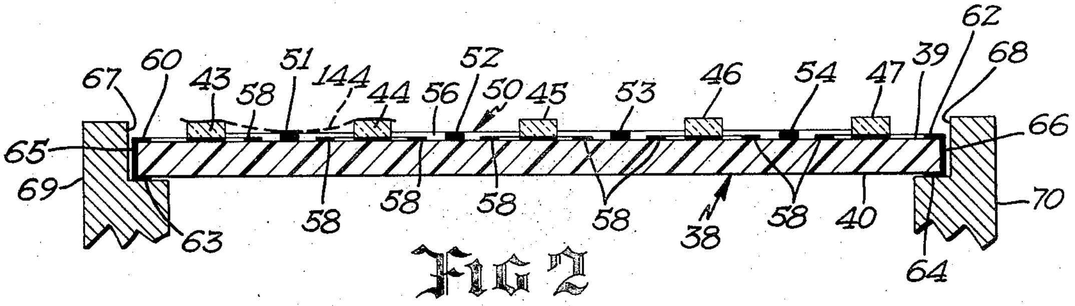

In FIGS. 1 and 2, a touch sensitive electronic switch, generally designated 30, is shown which is useful in connection with the composite D.C. amplifier of the present invention. Switch 30 includes a plastic housing 32 incorporating holes (not shown) for three pins, 35, 36, and 37 which allow connection to the switch 30. Switch 30 also includes another hole (not shown) for allowing the filling of the inside of housing 32 with an encapsulating compound.

Switch 30 includes a square of an insulating media or insulating material in the form of a ceramic slice 38 having a flat top surface or face 39 and bottom surface 40.

Ceramic 38 supports supply conductor or electrode 42 including five fingers 43, 44, 45, 46, and 47 which extend across the top face or switch face 39 of ceramic 38 from back to front. A conductive trace 48 positioned at the back edge of switch face 39 interconnects all supply fingers to form supply electrode 42.

Ceramic 38 also supports an input conductor or electrode 50 which includes four fingers 51, 52, 53, and 54 which extend across the switch face 39 from front to back. Input fingers 51–54 are arranged around and about and laterally spaced and insulated from supply fingers 43–47, and in particular are arranged with one input finger between each two supply fingers. A conductive trace 56 arranged on the front edge of switch face 39 perpendicularly to the input fingers 51–54 interconnects the input fingers to form input electrode 50.

Thus, supply electrode 42 and input electrode 50 take the form of interlaced or interdigitated fingers each extending from an edge of the switch face 39 towards one another.

Ceramic 38 also supports a reference, common, or ground conductor or electrode 58. Ground 58 is arranged in serpentine fashion around supply fingers 43–47 and between the interdigitated arrangement of supply fingers 43–47 and input fingers 51–54, laterally spaced and insulated from both sets of fingers. That is, starting at the left edge of ceramic 38 as shown in FIG. 2, with conductive trace 60 forming a portion of ground electrode 58, electrode 58 extends towards the front edge of switch 30 around the end of supply finger 43, and towards the back edge of switch face 39, around the end of input finger 51, and towards the front edge of switch face 39, around the end of supply finger 44, and again towards the back edge of switch face 39, and from there around input finger 52, supply finger 45, input finger 53, supply finger 46, input finger 54, supply finger 47, and to the right edge of switch face 39, as shown in FIG. 2, to terminate in conductive trace 62.

Ceramic 38 is then arranged within the notches 67 and 68 cut into opposite side walls 69 and 70 of housing 32 and similarly within notches, not shown, cut into the front and back walls of housing 32 with pins 35, 36, and 37 connected to the electronic circuitry as indicated below.

Figure 3:
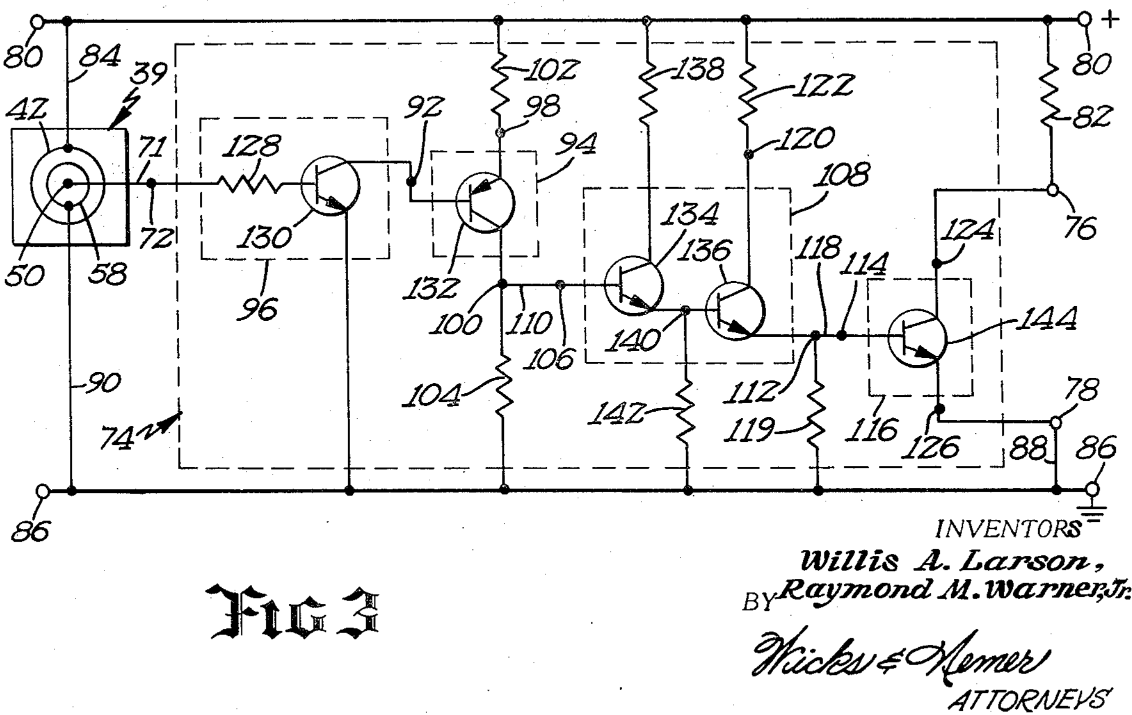
FIG. 3 shows a schematic representation of a preferred embodiment of the electronic circuitry of the present invention arranged for integrated circuit fabrication.

In FIG. 3, switch face 39 is shown in schematic form with supply electrode 42, input electrode 50, and ground electrode 58 also schematically represented.

Input electrode 50 is connected by a lead 71 to input 72 of a composite amplifier, generally designated 74, including outputs 76 and 78. Output 76 is connected to a first terminal 80 of a D.C. voltage source or supply through resistor 82 representing an electrical load. Supply terminal 80 is also connected to supply electrode 42 through a lead 84. Output 78 is connected to a second supply terminal 86 of the D.C. voltage supply through a connection 88. Terminal 86 is further connected to ground electrode 58 by a connection 90. The D.C. voltage source, not specifically shown, includes the first and second terminals 80 and 86, and provides direct current to amplifier 74. As shown in the preferred embodiment of FIG. 3, terminal 86 is a common, ground, or reference terminal, and terminal 80 is of a positive D.C. voltage differing from the voltage at 86.

The connection of pins 35, 36, and 37 may now be explained. Pin 35 is connected to junction point 76 to form the output pin of switch 30. Pin 36 is connected to supply terminal 80, and pin 37 is connected to supply terminal 86 to provide a power input to switch 30.

Input 72 to composite amplifier 74 is connected to input 92 of a first amplifier 94 through a buffer amplifier 96. First amplifier 94 further includes two outputs in the form of junction points 98 and 100. A current limiting resistor 102 is connected between junction point 98 and supply terminal 80, and a leakage prevention resistor 104 is connected between junction point 100 and supply terminal 86. Junction point 100 is further connected to an input junction point 106 of a second amplifier 108 through a lead 110. Second amplifier 108 includes an output junction point 112 connected to an input junction point 114 of a third amplifier 116 by a lead 118 and to supply terminal 86 by another leakage prevention resistor 119. Second amplifier 108 further includes output junction point 120 connected to supply terminal 80 by a current limiting and parasitic oscillation reducint resistor 122. Third amplifier 116 includes an output junction point 124 connected to output 76 of amplifier 74 and an output junction point 126 connected to output 78 of amplifier 74.

Buffer amplifier 96 includes a base current limiting resistor 128 connected between input 72 and the base of an NPN transistor 130. Transistor 130 has its emitter connected to supply terminal 86 and its collector connected to input junction point 92 of first amplifier 94.

First amplifier 94 includes PNP transistor 132 having its base connected to junction point 92, its emitter connected to junction point 98, and its collector connected to junction point 100.

Second amplifier 108 includes two amplifying stages in the form of NPN transistors 134 and 136 connected in a Darlington type arrangement. First Darlington transistor 134 has a base connected to junction point 106, a collector connected to supply terminal 80 through another current limiting and oscillation reducing resistor 138. The emitter of transistor 134 provides an output current to the base of the second Darlington transistor 136 through junction point 140. Second Darlington transistor 136 has its emitter connected to junction point 112, and its collector connected to junction point 120.

A leakage prevention resistor 142 is connected between junction point 140 and supply terminal 86.

Third amplifier 116 includes NPN transistor 144 with its base connected to junction point 114, its collector connected to junction point 124, and its emitter connected to junction point 126.

OPERATION

Generally, in operating the touch sensitive electronic switch 30 shown in FIGS. 1 and 2, the finger of an operator is placed upon the switch face 39, for example as shown by the finger portion 144 shown in FIG. 2. The electrical skin resistance of the operator causes a direct current path to be set up between input electrode 50 and supply electrode 42 to thus cause a small current to flow between these electrodes. The current flowing is generally in the nanoampere range (30–300 nanoampere) with normal skin resistances and supply voltages of approximately 5 volts. This D.C. input current is amplified by the various stages of composite amplifier 74 shown in FIG. 3 to a point where at least output transistor 144 saturates and approximates an electronic switch in the closed or ON condition to the electrical load 82 also connected across supply terminals 80 and 86. When the operator's finger 144 is removed from switch 30, the characteristics of the switch prevent input current from reaching input 72 of composite amplifier 74 and rapidly render the amplifying stages to and including output transistor 144 nonconducting. Thus, with the operator's finger removed from switch 30, composite amplifier 74 appears as an electronic switch in an open or OFF condition to load 82, and no current is allowed to flow in the electrical load.

In particular, composite amplifier 74 as shown is arranged for fabrication as an integrated circuit. That is, transistor 130 is necessary because of present integration methods. If composite amplifier 74 were to be fabricated of discrete components or as a hybrid of metalization and separate transistor chips bonded to the metalization, resistor 128 could interconnect input 72 of the composite amplifier 74 and junction point 92 of first amplifier 94. Also, the connections of electrodes 42 and 58 would be inverted such that electrode 42 would connect to terminal 86 and electrode 58 would connect to terminal 80 to thus provide the appropriate bias to transistor 132 upon the bridging of electrodes 42 and 50 by the finger of an operator.

In this arrangement, terminal 80 functions as the ground, reference, or common terminal of the circuit. Terminal 80 in this arrangement could also be an actual ground point in the circuit if a negative supply voltage were applied to terminal 86. As will be realized by those skilled in the art, this latter arrangement of voltages yields an identical result to the arrangement shown in FIG. 3 with the exception that the opposite terminal functions as an actual ground point in the circuit. Thus, the only requirement upon the connection of electrode 58 and electrode 42 is that they connect to opposite supply terminals, and the connection of electrode 58 is to a reference terminal in that the terminal has a D.C. potential which will in fact shield the input to the amplifier 74. Thus, the remaining discussion of amplifier 74 will be without transistor 130.

Resistor 128 performs a current limiting function in the event electrode 42 is directly shorted to electrode 50, for example by a fragment of metal placed on the face of the switch. Thus, the value of resistor 128 is dependent upon the voltage supply and the maximum base-emitter current tolerable by the first transistor.

A requirement of the transistor used as the first or input transistor to amplifier 74 is that this transistor must have some current gain at input currents on the order of 10–100 nanoamperes. This is because current gain should be available from this transistor for voltage supplies as low as 5 volts and with skin resistance on the order of 100 megohms. Therefore, the composite amplifier 74 of the present invention has the advantage of accepting an extremely low input current and yet provide gain.

Resistor 102 also provides a current limiting function in preventing unbounded current from flowing from supply terminal 80 through the collector-emiter of transistor 132, the base-emitter of transistor 134, the base-emitter of transistor 136, and the base-emitter of transistor 144 to supply terminal 86. Thus, the value of resistor 102 is dependent upon the maximum currents tolerable through these junctions.

The arrangement of transistors within amplifier 108 is termed a type of Darlington arrangement in that a conventional Darlington arrangement would dictate that the collector of transistor 134 be directly connected to the collector of transistor 136, both collectors be connected directly to supply terminal 80, and the emitter of transistor 134 be directly connected to the base of transistor 136, thus necessitating the removal of resistors 138, 122, and 142.

Resistor 142 has been found to improve amplifier characteristics with switch 30 in a nonactivated condition in that leakage current flowing through transistor 134 can be shunted through resistor 142 rather than into the base of transistor 136 where it may be amplified to increase the output current flowing through transistor 144 and thus degrade the desired open or OFF effect of composite amplifier 74. It has further been found that if resistor 142 has a maximum value of approximately 1/10 of the nonconductive input resistance of transistor 136, this shunting of leakage current is accomplished, and resistor 142 prevents an increased output current from the composite amplifier. Of course, resistor 142 can be reduced in value to increase its shunting effect, however, a point is reached at which the voltage dividing effect of resistor 142 and resistor 138 degrades the gain of amplifier 108 below the gain necessary to provide an appropriate output current. Thus, the composite amplifier 74 of the present invention has the advantage of extremely low output current when switch 30 is not actuated. Output current is in the order of the leakage current of transistor 144.

Resistors 104 and 119 provide a leakage current shunting effect in a similar fashion to resistor 142.

Resistors 138 and 122 provide a current limiting function similar to the current limiting function of resistor 102 and further provide for a dampening of any oscillation within the amplifier because of its exceedingly high gain.

The use of a PNP transistor within first amplifier 94, with a base emitter voltage offset of negative to positive in conjunction with the NPN transistor 134 within a second amplifier 108 with a base emitter voltage offset of the opposite polarity, positive to negative, allows the voltage offset appearing at input 92 to be simply the voltage offset required by a single transistor. It is to be noted that the same effect is achieved by the use of transistor 130. Thus, the composite amplifier 74 of the present invention requires a low offset voltage at its input .

The connection of the collector of transistor 144 directly to load resistor 82 rather than the connection of the collectors of transistors 134, 136, and 144, which is a functional arrangement for a conventional Darlington circuit, allows composite amplifier 74 to provide an extremely low voltage across its output when electronic switch 30 is actuated and a conducting or ON condition is desired. If the collectors of transistors 134, 136, and 144 were to be connected together, the lowest voltage obtainable across the collector-emitter junction of transistor 144 can be seen by a voltage level analysis to be dependent on the parameters of prior circuit elements, and does not reach the low level obtainable from a single transistor. By the arrangement shown, no such high voltage output obtains, and the voltage output is the saturated voltage output of transistor 144 which is extremely low. Thus, a low output voltage is provided by composite amplifier 74 of the present invention in the conducting or ON condition.

From the foregoing it is believed that one skilled in the art can adequately select circuit parameters to insure proper performance. One such set of values found to perform well with the normal 30–100 nanoamperes input expected from the bridging of supply electrode 42 and input electrode 50 to provide an output current from 5 to 150 milliamperes with a supply voltage of 25 volts is as follows:

Resistor 102—10 to 100 kilohms
Resistor 104—1 megohm

Resistor 119—1 megohm
Resistor 122—2.2 kilohm
Resistor 128—2.2 kilohm Resistor 138—10 kilohm
Resistor 142—1 megohm
Transistor 132 2N3906
Transistors 134 and 136 —2N5306, 07, or 08
Transistor 144—2N2222A The use of the 2N5306 for transistors 134 and 136 will cause a slight change in the circuitry shown in FIG. 3 because both transistors 134 and 136 are physically on a single integrated circuit chip contained within a single package as a Darlington circuit. Thus, resistor 142 is connected between junction point 140 and junction point 112. Its leakage resistance shunting effect is not seriously changed, however. Further, with the use of the 2N5306, resistors 122 and 138 are combined into a single resistor of approximately a value of 1.8 kilohms since the collectors of transistors 134 and 136 are internally connected and only one lead issues from the 2N5306 package.

Thus, a composite amplifier has been described which eliminates any need for capacitors, includes only direct current coupled stages, provides a high gain, provides a low voltage output in the ON condition, provides a low output current in the OFF condition, has the ability to operate with very low input current, and provides a low voltage offset at its input.

Now that the basic teachings of the present invention have been explained, many extensions and variations will be obvious to one having ordinary skill in the art. For example, amplifying elements other than transistors are envisioned.

Also, additional amplifying stages may be added to achieve yet higher gains.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is indicated by the appended claims, rather than by the foregoing description, and all changes which come within the meaning and range of equivalency of the claims are intended to be embraced therein.

What is claimed is:

1. A composite amplifier for providing an output signal in response to a D.C. input signal actuated by the skin resistance of an operator causing a lowering of D.C. resistance across a skin resistance actuated electronic switch, comprising: means for supplying a direct current including first and second terminals, the first and second terminals comprising one common terminal and one terminal of a D.C. voltage differing from the common terminal; first amplifier means including input means and at least two output means, the first amplifier means requiring a D.C. voltage offset of a first polarity be reached before an output signal is provided by the first amplifier means in response to an input signal; current limiting resistive means for connecting the skin resistance actuated electronic switch to the input means of the first amplifier means to provide a D.C. input signal to the first amplifier means upon the lowering of the D.C. resistance path across the skin resistance actuated electronic switch; means for connecting a first output means of the first amplifier means to the first supply terminal; second amplifier means including input means and at least two output means and at least first and second amplifying stages with the first amplifying stage including input means and output means and the second amplifying stage including input means and at least two output means, the second amplifier means requiring a D.C. voltage offset of a second polarity be reached before an output signal is provided by the second amplifier means in response to an input signal, the second polarity being opposite from the first polarity required by the first amplifier means, with the input means of the first amplifying stage comprising the input means to the second amplifier means and the output means of the second amplifying stage comprising the output means for the second amplifier means, and with a junction means within the second amplifier means connecting an output means of the first amplifying stage to the input means of the second amplifying stage; means for connecting a second output means of the first amplifier means to the input means of the second amplifier means; means for connecting the first output means of the second amplifier means to the first supply terminal; leakage resistance means for connecting the junction means of the second amplifier means to the second supply terminal for providing a shunting path for leakage current to aid in preventing an increased output current from the composite amplifier, the leakage resistance means having a maximum resistance value of approximately 1/10 of the nonconductive input resistance of the second amplifying stage of the second amplifier means; third amplifying means including input means and at least two output means; means for connecting a second output means of the second amplifier means to the input means of the third amplifier means; means for connecting a first output means of the third amplifier means to one of the first and second supply terminals; and means connected to a second output means of the third amplifier means for providing an output signal from a third amplifier means in response to an input signal to the first amplifier means actuated by the skin resistance of an operator causing a lowering of D.C. resistance across a skin resistance actuated electronic switch.

2. The composite amplifier of claim 1, wherein the leakage resistance means comprises a resistor of a value substantially between 1 megohm and 10 megohms.

3. The composite amplifier of claim 2, wherein: the first amplifier teans comprises a first transistor wherein the input means to the first amplifier means comprises the base of the first transistor, the first output means of the first amplifier means comprises the emitter of the first transistor, and the second output means of the first amplifier means comprises the collector of the first transistor; and the second amplifier means comprises a Darlington arrangement of transistors wherein the input means of the second amplifier means comprises the base of the first Darlington transistor, the first output means of the second amplifier means comprises the collector of the last Darlington transistor, and the second output means of the second amplifier means comprises the emitter of the last Darlington transistor, and the junction means connects the emitter of the first Darlington transistor with the base of a second Darlington transistor to thereby connect the leakage resistance means from the emitter of the first Darlington transistor to the second supply terminal for providing a shunting path for leakage current from the first Darlington transistor to aid in preventing an increased output current from the composite amplifier.

4. The composite amplifier of claim 3, including a leakage resistor between the emitter of each transistor in the Darlington arrangement and the second supply terminal for providing a shunting path for leakage current to aid in preventing an increased output current from the composite amplifier.

5. The composite amplifier of claim 4, wherein the first amplifier comprises a PNP transistor; the Darlington arrangement of transistors is formed of NPN transistors; and the third amplifier means comprises an NPN transistor wherein the input to the third amplifier means comprises the base of the NPN transistor, the first output means of the third amplifier means comprises the emitter of the NPN transistor, and the second output means of the third amplifier means comprises the collector of the NPN transistor.

6. The composite amplifier of claim 5, wherein the means for connecting the collector of the first transistor to the base of the first Darington transistor includes a leakage resistor connecting the collector of the first transistor to the second supply terminal for providing a shunting path for leakage current to aid in preventing an increased output current from the composite amplifier.

7. The composite amplifier of claim 6, including a resistor from the collector of the first Darlington transistor to the first supply terminal to aid in reducing the effect of any parasitic oscillations in the composite amplifier.

8. The composite amplifier of claim 7, including a to the first supply terminal to aid in reducing the effect of any parasitic oscillations in the composite amplifier.

9. The composite amplifier of claim 1, wherein the first amplifying stage of the second amplifier means includes first and second output means, the junction means connecting the first output means of the first amplifying stage to the input means of the second amplifying stage; and resistance means for connecting the second output means of first amplifying stage to the first supply terminal to aid in reducing the effect of any parasitic oscillations in the composite amplifier.

10. The composite amplifier of claim 9, wherein the means for connecting the first output means of the second amplifier means to the first supply terminal comprises resistance means to aid in reducing the effect of any parasitic oscillations within the composite amplifier.

11. The composite amplifier of claim 1, wherein the means for connecting the second output of the first amplifier means to the input means of the second amplifier means includes leakage resistance means for connecting the second output means of the first amplifier means to the second supply terminal for providing a shunting path for leakage current to aid in preventing an increased output current from the composite amplifier.

12. The composite amplifier of claim 1, wherein: the first amplifier means comprises a first transistor wherein the input means to the first amplifier means comprises the base of the first transistor, the first output means of the first amplifier means comprises the emitter of the first transistor, and the second output means of the first amplifier means comprises the collector of the first transistor; and the second amplifier means comprises a Darlington arrangement of transistors wherein the input means of the second amplifier means comprises the base of the first Darlington transistor, the first output means of the second amplifier means comprises the collector of the last Darlington transistor, and the second output means of the second amplifier means comprises the emitter of the last Darlington transistor, and the junction means connects the emitter of the first Darlington transistor with the base of a second Darlington transistor to thereby connect the leakage resistance means from the emitter of the first Darlington transistor to the second supply terminal for providing a shunting path for leakage current from the first Darlington transistor to aid in preventing an increased output current from the composite amplifier.

13. The composite amplifier of claim 11, including a leakage resistor between the emitter of each transistor in the Darlington arrangement and the second supply terminal for providing a shunting path for leakage current to aid in preventing an increased output current from the composite amplifier.

* * * * *

UNITED STATES PATENT OFFICE

CERTIFICATE OF CORRECTION

Patent No. 3,766,404 Dated October 16, 1973

Willis A. Larson and Raymond M. Warner, Jr.

It is certified that error appears in the above-identified patent and that said Letters Patent are hereby corrected as shown below:

Column 4, line 13, delete "reducint" and substitute therefor --reducing--.

Column 8, line 47, claim 3, delete "teans" and substitute therefor -- means--.

Column 9, line 32, claim 8, after "a" insert the following words --resistor from the collector of the last Darlington transistor--.

Signed and sealed this 19th day of February 1974.

(SEAL)
Attest:

EDWARD M.FLETCHER,JR.
Attesting Officer

C. MARSHALL DANN
Commissioner of Patents

203